US011328330B2

(12) United States Patent
Helvie et al.

(10) Patent No.: US 11,328,330 B2
(45) Date of Patent: May 10, 2022

(54) SYSTEM FOR INVOICE PROCESSING FOR OVERSEAS VENDORS AND CARRIERS

(71) Applicant: Target Brands, Inc., Minneapolis, MN (US)

(72) Inventors: Eric Helvie, Eagan, MN (US); Andre G. Martin, Minneapolis, MN (US); Bindu Francis, Bangalore (IN)

(73) Assignee: TARGET BRANDS, INC., Minneapolis, MN (US)

(*) Notice: Subject to any disclaimer, the term of this patent is extended or adjusted under 35 U.S.C. 154(b) by 207 days.

(21) Appl. No.: 16/713,958

(22) Filed: Dec. 13, 2019

(65) Prior Publication Data
US 2020/0193492 A1    Jun. 18, 2020

Related U.S. Application Data

(60) Provisional application No. 62/779,144, filed on Dec. 13, 2018.

(51) Int. Cl.
*G06Q 30/00* (2012.01)
*G06Q 30/04* (2012.01)
*G06Q 40/00* (2012.01)

(52) U.S. Cl.
CPC ........... *G06Q 30/04* (2013.01); *G06Q 40/125* (2013.12); *G06Q 40/128* (2013.12)

(58) Field of Classification Search
CPC ..... G06Q 40/125; G06Q 40/128; G06Q 40/00
USPC .......................................................... 705/35
See application file for complete search history.

(56) References Cited

U.S. PATENT DOCUMENTS

| 7,406,472 | B2  |  7/2008 | Manucha et al. |
| 7,938,315 | B2* |  5/2011 | Marks ................ G06Q 30/0623 235/375 |
| 8,209,236 | B2  |  6/2012 | Stone et al. |
| 8,566,194 | B2* | 10/2013 | Livesay ................ G06Q 10/10 705/35 |
| 2002/0069096 | A1 | 6/2002 | Lindoerfer et al. |
| 2003/0069831 | A1 | 4/2003 | Le et al. |
| 2003/0074250 | A1* | 4/2003 | Burk ...................... G06Q 10/06 705/28 |
| 2003/0182206 | A1 | 9/2003 | Hendrix et al. |
| 2005/0075941 | A1 | 4/2005 | Jetter et al. |

(Continued)

FOREIGN PATENT DOCUMENTS

KR         20030042177 A    5/2003

OTHER PUBLICATIONS

The role of electronic commerce technologies in just-in-time replenishment. Author Johnston et al Proceedings of the Thirtieth Hawaii International Conference on System Sciences (vol. 4, pp. 439-448 vol. 4) (Year: 1997).*

*Primary Examiner* — Bruce I Ebersman
*Assistant Examiner* — John A Anderson
(74) *Attorney, Agent, or Firm* — Merchant & Gould P.C.

(57) ABSTRACT

A computer-implemented method for processing invoices from overseas vendors and overseas carriers. The methods and systems retrieve (e.g., using various APIs) and rely on current data from the most accurate or up-to-date sources of such data, and then store the data in a single location as a "single source of truth" for invoice data. As a result, errors and time for processing overseas invoices are reduced because accurate data is more readily and promptly available for reconciling discrepancies and paying the invoices.

7 Claims, 9 Drawing Sheets

(56) References Cited

U.S. PATENT DOCUMENTS

| | | |
|---|---|---|
| 2005/0187874 A1 | 8/2005 | Sanal |
| 2008/0255863 A1 | 10/2008 | Mack et al. |
| 2009/0089145 A1 | 4/2009 | Kent et al. |
| 2009/0125350 A1 | 5/2009 | Lessing et al. |
| 2010/0299234 A1* | 11/2010 | Stone .................. G06Q 20/403 705/30 |
| 2011/0050397 A1 | 3/2011 | Cova |
| 2013/0218723 A1* | 8/2013 | Masud .................. G06Q 30/06 705/26.62 |
| 2013/0304639 A1* | 11/2013 | Acsay .................. G06Q 30/04 705/40 |
| 2014/0236661 A1 | 8/2014 | Sherrill et al. |
| 2014/0324548 A1* | 10/2014 | Long .................. G06Q 30/0206 705/7.35 |
| 2018/0144314 A1* | 5/2018 | Miller .................. G06Q 20/14 |

\* cited by examiner

SYSTEM FOR INVOICE PROCESSING FOR OVERSEAS VENDORS AND CARRIERS

BACKGROUND

Conveying goods from overseas vendors to domestic distribution centers and, ultimately, to retailers or consumers can take an extended time. As a result, a number of events may occur during transit, including changed fuel or carrier rates, inclement weather, intervening loading or unloading, carrier transitions (e.g., from sea carrier to land carrier), container transitions (e.g., from one truck to another), and the like. These various events may result in changes to landed costs, damage to goods, misplacement of goods, unscheduled delays, etc. As a result, processing invoices from overseas vendors and carriers presents a number of challenges. For instance, at the time of placing an order for goods, estimated landed costs ("ELC") may be relied on to generate the purchase order, which costs must then be updated with actual landed costs ("ALC") when the goods reach a domestic distribution center. Additionally, the quantity, type, or quality of goods actually landed at the distribution center may not be the quantity, type, or quality of goods ordered or shipped. That is, the extended transit period may result in missing or damaged goods—or the landed goods may simply not match the ordered goods. Previously, when processing invoices from overseas vendors and carriers, it was difficult to reconcile an invoice with the actual landed items and landed costs because such data was often out-of-date or unavailable.

Accordingly, in order to properly process overseas invoices, it is desirable to have access to real-time data.

SUMMARY

In general, methods and systems for processing invoices from overseas vendors or carriers are described. The methods and systems described herein leverage application programming interfaces ("APIs") to access to one or more external data sources to retrieve current data for reconciling and processing invoices from overseas vendors and carriers. In at least some embodiments, one or more of the external data sources is an ultimate source of the current data (e.g., an entity responsible for generating or relaying the current data to other entities). The methods and systems also disclose maintaining a single local database of current data (e.g., a "single source of truth") in order to avoid data storage and maintenance in multiple locations with multiple points of failure. For example, storing and maintaining data across different finance, order tracking, and inventory modules can result in such multiple points of failure.

In an aspect, a method for processing an invoice from an overseas vendor is provided. The method includes receiving, at a software tool implemented on a computing system, an invoice from an overseas vendor, where the invoice includes at least one billed item, a billed price, a billed quantity, and a billed landed cost ("LC"). The method further includes retrieving current data by accessing at least one interface. The current data includes one or more of: a purchase order including at least one ordered item, an agreed price, an ordered quantity, and an estimated landed cost ("ELC"); a receipt from a distribution center, the receipt specifying at least one landed item and a landed quantity; and an actual landed cost ("ALC") for the at least one landed item and landed quantity. The method further includes determining whether the invoice reconciles with the current data and, when the invoice reconciles with the current data, selecting the invoice for payment.

In another aspect, a computing system for processing an invoice from an overseas carrier is provided. The computing system includes a processor communicatively coupled to a memory, the memory stores computer-executable instructions including a software tool which, when executed, causes the computing system to perform a number of steps. For instance, the computing system is programmed to receive an invoice from an overseas carrier, where the invoice includes at least one invoice amount, a carrier billed rate, a bill of lading ("BOL") number, a port of entry, a date of arrival, or a purchase order ("PO") number. The computing system further retrieves current data by accessing at least one interface, where the current data includes: a purchase order ("PO") associated with the PO number comprising at least one of a bid rate, an estimated date of arrival ("EDA"), or an estimated landed cost ("ELC"), and a plurality of current carrier rates associated with the date of arrival and the port of entry. The computing system further performs one or more audits of the invoice based on the PO and the plurality of current carrier rates. In response to the one or more audits, the computing system determines whether the invoice reconciles with the current data and, when the invoice reconciles with the current data, receives a selection of the invoice for payment.

In yet another aspect, a retail web server configured for processing an invoice from an overseas vendor is provided. The retail web server includes a computing system including a processor communicatively coupled to a memory, the memory storing computer-executable instructions including a software tool which, when executed, causes the computing system to perform a number of steps. For instance, the computing system is programmed to receive an invoice from an overseas vendor, wherein the invoice includes at least one billed item, a billed price, a billed quantity, and a billed landed cost ("LC"). The computing system further retrieves current data by accessing at least one interface, where the current data includes one or more of: a purchase order including at least one ordered item, an agreed price, an ordered quantity, and an estimated landed cost ("ELC"); a receipt from a distribution center, the receipt specifying at least one landed item and a landed quantity; and an actual landed cost ("ALC") for the at least one landed item and landed quantity. The computing system further determines whether the invoice reconciles with the current data and, when the invoice reconciles with the current data, receives a selection of the invoice for payment.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
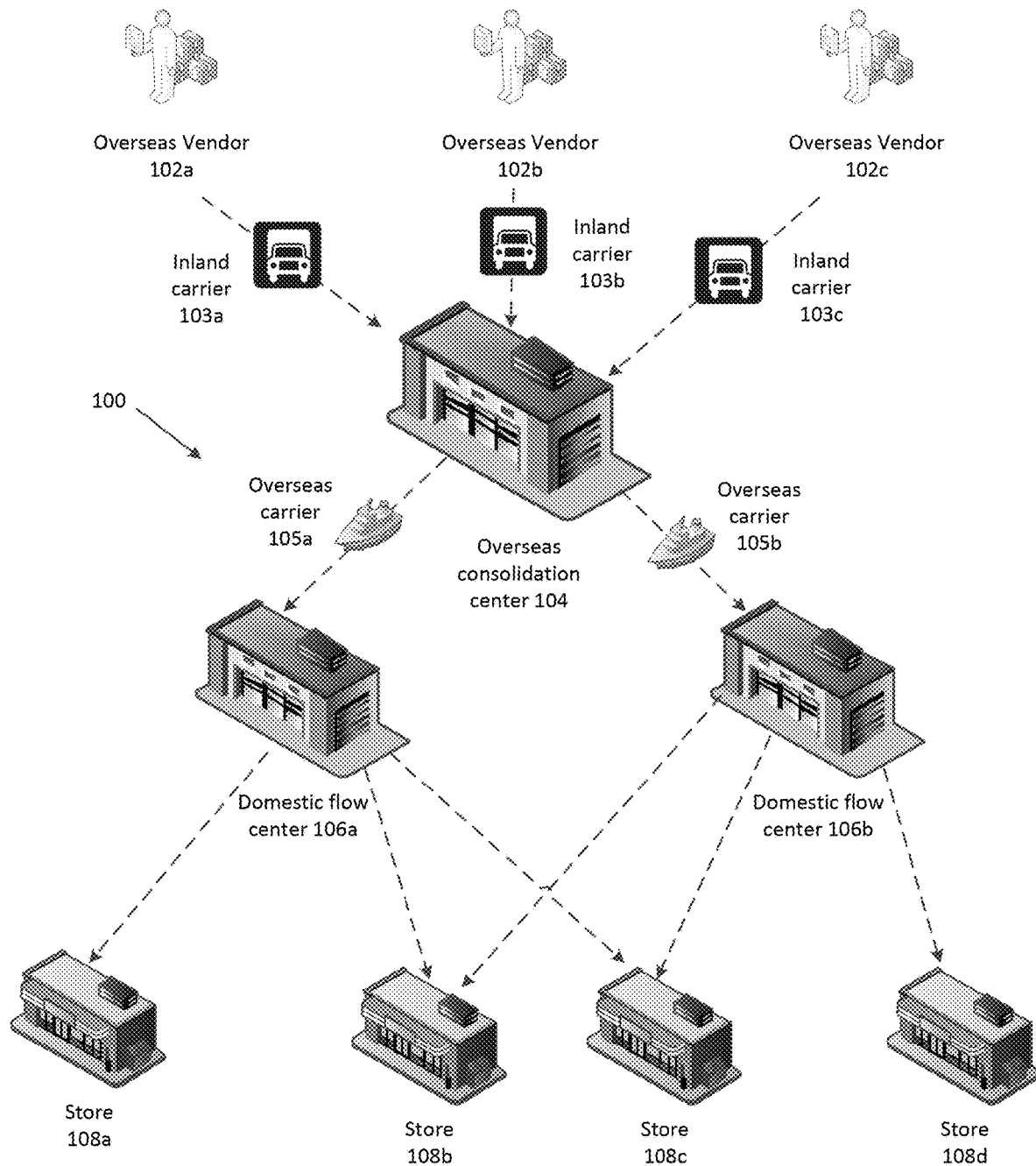
FIG. 1 illustrates a schematic diagram of an example supply chain for a retail enterprise.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the present disclosure describes invoice processing systems and methods which rely on current data to reconcile and pay the invoices. Previously, due to the extended transit period and multiple (sometimes unforeseen) events between generating a purchase order and actually receiving ordered goods, reconciling invoices from overseas vendors or carriers was challenging. In fact, the multiple events may be associated with different entities, including the vendors or carriers, as well as duty brokers, customs agencies, consolidators, deconsolidators, etc., and the data associated with such events may be generated by such entities or other entities (e.g., brokers or expeditors). Not only so, but data associated with the different events may be relayed to different components of an enterprise system, e.g., a PO module, an inventory module, an order tracking module, a finance module, etc. The receipt and storage of data in different locations creates multiple points of failure and increases the likelihood of outdated data across the various locations. Rather, the present systems retrieve (e.g., using various APIs) and rely on current data from the most accurate or up-to-date sources of such data, and then store the data in a single location as a "single source of truth" for invoice data. As a result, errors and time for processing overseas invoices are reduced because accurate data is more readily and promptly available for reconciling discrepancies and paying the invoices.

FIG. 1 illustrates a schematic diagram of an example supply chain for a retail enterprise. The diagram 100 illustrates the flow of goods from overseas vendor(s) 102 to retail store(s) 108. Goods may include any item, product, raw material, and the like, which is ordered by the retail enterprise from the overseas vendor(s) 102. The goods move through various nodes to arrive at the retail store(s) 108. In this example, the nodes include three overseas vendors 102a/102b/102c, three inland carriers 103a/103b/103c, an overseas consolidation center 104, two overseas carriers 105a/105b, two domestic flow centers 106a/106b, and four retail stores 108a/108b/108c/108d. In practice, the supply chain could include many more nodes in different proportions. In some embodiments, there are more or fewer carriers, including both foreign and domestic inland carriers, overseas carriers, and/or air carriers. In additional or alternative embodiments, there are more overseas consolidation centers 104 and/or more or fewer domestic flow centers 106. Domestic flow centers 106 may include various warehouses or "distribution centers" for receiving and holding goods before distribution to retail stores. Arrows in the diagram indicate movement of goods.

When goods are received at flow center(s) 106, a "receipt" is generated that specifies information regarding each item received, including an identification of the item, a landed time (e.g., a date or a date/time of receipt) and a received quantity. In some cases, the receipt may further include an indication of the condition of the received item, such as "damaged," "open box," "good," "fair," "excellent," and the like. Additionally or alternatively, the receipt may specify an item type for the received item, such as item size, item color, item manufacturer, item distributor, and the like. As should be appreciated, depending on the received item, more or less information may be specified on the receipt.

Overseas vendor(s) 102 produce the items or products that will be sold by the retail enterprise. A purchase order ("PO") is typically placed to request products from an overseas vendor. In some instances, the overseas vendor 102 will transport the ordered products (e.g., via inland carrier(s) 103) to the overseas consolidation center 104. In other instances, the retail enterprise may arrange for the products to be picked up from the overseas vendor(s) 102 and transported to the overseas consolidation center 104. Once at the overseas consolidation center 104, the products are prepared for transportation to one or more domestic flow center(s) 106. At the time the products are prepared for transport, an estimated landed cost ("ELC") is determined for the goods. The ELC may be based on a number of factors, including the quantity and type of goods to be transported, type of carrier (e.g., inland, overseas, or air carriers), fuel costs, average landed costs per cubic meter for same or similar port-to-port transit; estimated duration of transit, stages or "legs" of transit (e.g., inland stage and overseas stage; inland stage and air stage; and the like), duties or taxes, and the like. The PO is then updated with the ELC.

Transit from the overseas consolidation center 104 may take many days to many weeks to even months, for instance, depending on the distance from the overseas consolidation center 104 to the domestic flow center 106 and on the type of carrier. Domestic flow center(s) 106 are typically positioned to enable quick shipment to one or more retail stores 108. Each domestic flow center 106 may supply the received items to multiple retail stores 108. In some instances, more than one domestic flow center 106 will send goods to a retail store 108. As provided above, when goods (items) are received (or "landed") at the domestic flow center 106, a receipt is generated specifying information such as identification and quantity of the items received (or landed), item types, landed time, item condition, and the like. Additionally, when items are received at the domestic flow center 106, an actual landed cost ("ALC") is determined. The ALC is based on the actual quantity and type of goods transported, the actual carriers, duration of transit, actual fuel costs, etc. The ALC may appear on the receipt or may be available via one or more interfaces, such as a vendor management application programming interface ("API"), a landed cost ("LC") API, a carrier API, a duty broker API, or the like. In some embodiments, the ALC may be available for retrieval from the one or more interfaces when the items are landed at the domestic flow center 106.

In embodiments, upon delivery of goods to the domestic flow center 106, the overseas vendor(s) 102 and/or one or more overseas carriers 105 may generate an invoice for the goods and/or for delivery of the goods, respectively. For instance, the invoice may be in the form of an Electronic Data Interchange ("EDI") 210 (i.e., a motor carrier freight details and invoice) or an EDI 810 (i.e., invoice). If the invoice is generated by the vendor (e.g., EDI 810), the invoice may specify at least one billed item, a billed price, a billed quantity, and a billed landed cost ("LC"). The billed LC may include, for example, carrier costs, taxes and duties, broker duties, and the like. If the invoice is generated by the carrier (e.g., EDI 210), the invoice may specify one or more of the quantity and types of items carried (or landed), item weight, item size, item packaging or handling restrictions (e.g., hazardous, fragile, etc.), manner of loading or unloading (e.g., two-person carry, fork lift, etc.), transit distance, duties or taxes, and the like. Additionally, the invoice (whether an EDI 210 or EDI 810) may specify an item condition upon delivery (e.g., good, fair, damaged, destroyed, open box, etc.). As should be appreciated, depending on the types and quantities of items delivered, and on whether the vendor or the carrier generates the invoice, the invoice may include additional information, including container or carton dimensions, container type, package type, and the like.

From the domestic flow center(s) 106, goods may be further shipped to retail stores 108. In aspects, the retail enterprise may arrange for domestic inland carriers to transport goods from the domestic flow center(s) 106 to the retail store(s) 108. Once products arrive at the retail store(s) 108, they are available for in-store purchases, pick-up orders, or local delivery.

It is in this general supply chain retail environment that the following systems and methods operate. While the methods and systems are described in a retail environment having brick-and-mortar retail stores as well as online sales, additional applications are possible. For example, the systems and methods could operate in a supply chain of warehouses that only distribute products to customers in fulfillment of online orders.

Figure 2:
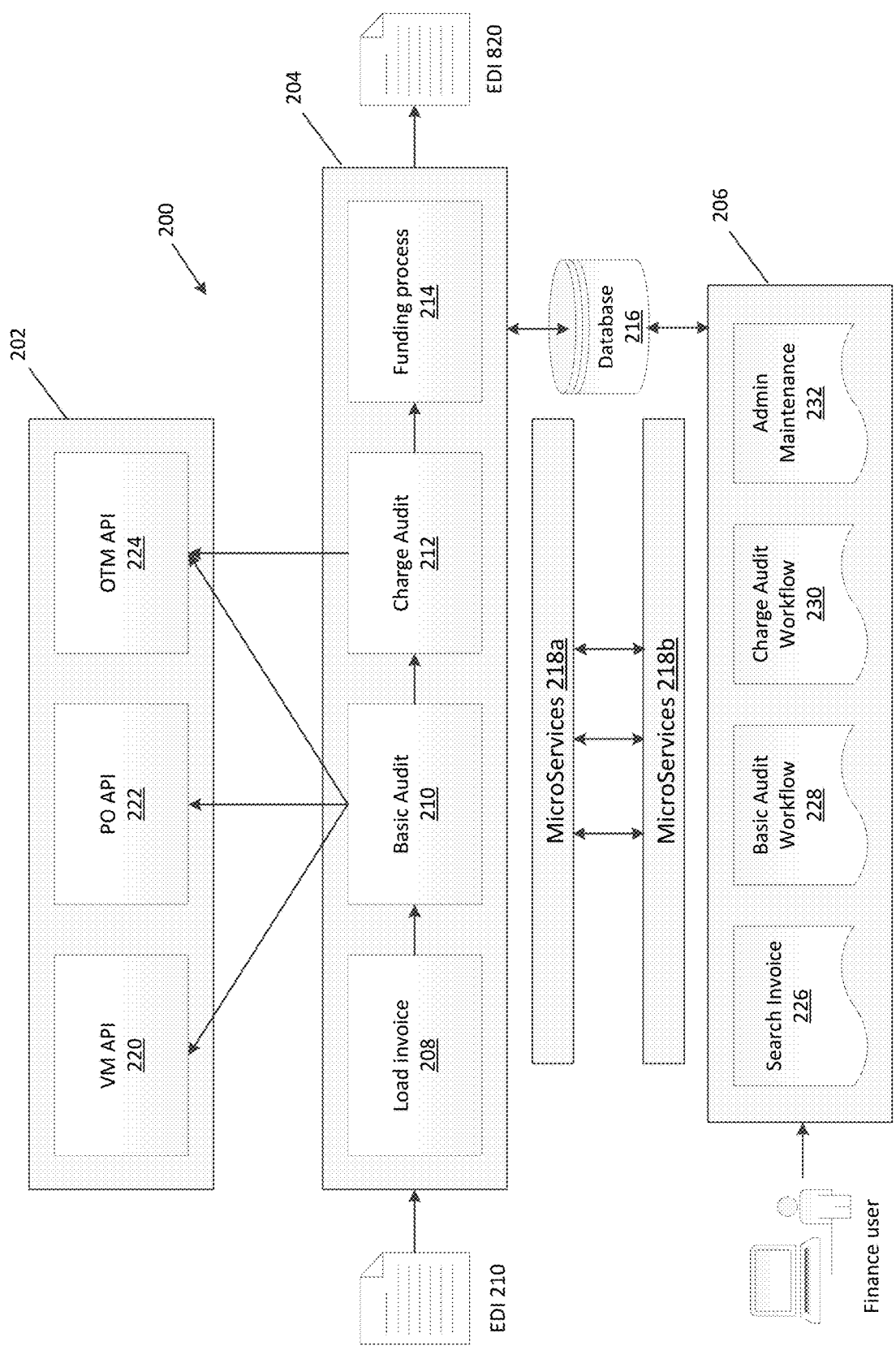
FIG. 2 illustrates an example block diagram of a system usable for processing an invoice from an overseas carrier.

FIG. 2 illustrates a schematic diagram of an example system 200 for processing invoices from overseas carriers. The components of the invoice processing system 200 include one or more external interfaces 202 (including application programming interfaces, or "APIs," for retrieving current invoice data from external sources), invoice reconciliation tool 204, and internal user interface 206. Together, the one or more external interfaces 202, invoice reconciliation tool 204, and internal user interface 206 operate to process invoices received from overseas carriers. For example, such invoices may be in the form of "EDI 210" (i.e., motor carrier freight details and invoice).

In aspects, an invoice (e.g., EDI 210) may be received from an overseas carrier at the invoice reconciliation tool 204. The invoice may include at least one billed item, a billed item quantity, and a billed landed cost ("LC"), for instance. The invoice reconciliation tool 204 may include a number of stages or components. For instance, upon receipt, the invoice may be loaded 208 into the invoice reconciliation tool 204. The invoice may then advance to a basic audit stage 210. At the basic audit stage 210, the invoice reconciliation tool 204 may access the one or more external interfaces 202 to retrieve current data from external sources in order to reconcile billed freight items (e.g., the items and quantities carried) associated with the invoice. Thereafter, the invoice may advance to charge audit stage 212. At the charge audit stage 212, the invoice reconciliation tool 204 may access the one or more external interfaces 202 to retrieve current data from external sources in order to reconcile billed freight charges (e.g., charges, duties, taxes, etc., for the items carried) associated with the invoice.

Current data may be defined as up-to-date data that reflects most-recent changes. In aspects, upon retrieval, the current data may populate (or update) a single local database 216 corresponding to a "single source of truth" for invoice data. The current data may be retrieved in real time each time a basic audit or a charge audit is conducted for an invoice. Alternatively, current data may be retrieved only when changes or updates are detected between the data reflected in the local database 216 and the current data maintained by the external sources. In other cases, rather than retrieving current data in real time, the current data may be retrieved according to a predefined schedule (e.g., every night, every morning, every Monday, etc.) or may be retrieved any time changes are detected based on periodically pinging the one or more external interfaces 202. As should be appreciated, current data may be retrieved according to any of the methods described above or any combination thereof.

Current data retrieved for a basic audit may include, for instance, current data regarding one or more ordered items (from the vendor) and/or one or more landed items (at a domestic flow center), including item identifier(s), item quantity, item type (e.g., item size, item color, item manufacturer and/or distributor, etc.), item weight and/or dimensions, item received condition (e.g., open box, damaged, destroyed, good, fair, etc.), item package details (e.g., carton type, weight or dimensions), item loading or unloading details (e.g., two-person carry, hand carry, fork lift carry, fragile, etc.), and the like. Similarly, current data retrieved for a charge audit may include, for example, current data regarding an ELC, an ALC (if available), overseas freight payment ("OFP") information, allowable variances associated with shipping costs, and the like.

The one or more external interfaces 202 for retrieving current data may include, for instance, a vendor management ("VM") API 220, a purchase order ("PO") API 222, and an Overseas Transportation Manager ("OTM") API 224. The VM API 220 may provide access to current data associated with the vendor, including quantity and types of ordered items, quantity and types of items delivered to an overseas consolidation center, overseas load date at the overseas consolidation center, inland carrier routes and costs, taxes and duties, and the like. The PO API 222 may provide access to current data regarding a purchase order for items ordered and/or shipped from the vendor (e.g., in the form of EDI 850) and may include any change orders to the PO (e.g., in the form of EDI 860). Further, when the ordered items have landed at a domestic flow center, the PO API 222 may provide access to the actual landed cost ("ALC") for the goods. The OTM API 224 may provide access to current data regarding OFPs, which may have been made, are pending, or are due. OFP data may include the carrier's foreign or domestic bank information, bank holiday information, wiring instructions, current currency exchange rates, and the like. Additionally or alternatively, if available, the OTM API 224 may provide access to the ALC for landed items and landed quantities at a domestic flow center. As should be appreciated, the external interfaces identified above, as well as other external interfaces, may be accessed by the invoice reconciliation tool 204 at different times and for different reasons. For instance, at the basic audit stage 210, the invoice reconciliation tool 204 may access the VM API 220, the PO API 222 and the OTM API 224 to retrieve current data; whereas during the charge audit stage 212, the invoice reconciliation tool 204 may only access the OTM API 224 to retrieve current data. The invoice reconciliation tool 204 may also access other external interfaces (not shown), such as an international carrier list ("ICL") API, a landed cost ("LC") API, and the like.

In this way, auditing and processing invoices is improved by leveraging access to the one or more external interfaces 202 to retrieve current data, which may be maintained in a single local database 216 as a "single source of truth" for invoice data. Previously, due to the extended transit period and multiple (sometimes unforeseen) events between generating the purchase order and actually receiving the ordered goods, reconciling invoices from overseas carriers was challenging. In fact, the multiple events may be associated with different entities, including duty brokers, customs agencies, consolidators, deconsolidators, etc., and the data associated with such events may be generated by such entities or other entities (e.g., brokers). Not only so, but data associated with the different events may be relayed to different components of an enterprise system, e.g., a PO module, an inventory module, an order tracking module, a finance module, etc. The receipt and storage of data in different locations created multiple points of failure and increased the likelihood of outdated data across the various locations. Rather, the present systems retrieve and rely on current data from the most accurate or up-to-date sources of such data, and then store the data in a single location. As a result, errors and time for processing overseas invoices are reduced because accurate data is more readily and promptly available to reconcile discrepancies and pay the invoices.

After successfully completing the basic audit stage 210 and the charge audit stage 212, if approved, the invoice may advance to a funding process 214. At funding process 214, approved invoices are processed for payment (or funding). During funding process 214, approved funding amount, invoice identifier, carrier bank information, wiring instructions, and the like, are populated into an EDI 820, which is an electronic payment order or remittance advice for the invoice. Upon generating and forwarding the EDI 820 for funding, invoice processing is complete.

As further illustrated by system 200, the invoice reconciliation tool 204 may further be accessed by the internal user interface 206. Internal user interface 206 enables users (e.g., internal finance employees or "finance users") to monitor, review, approve, and otherwise interact with the invoice reconciliation tool 204. Internal user interface 206 may access the invoice reconciliation tool 204 via a set of MicroServices 218a/218b. As used herein, a "MicroService" may refer to a service-oriented architecture in which applications are built or developed as a collection of smaller, discrete applications rather than as a single larger application. MicroServices 218a/218b may be associated with either or both of the invoice reconciliation tool 204 and/or the internal user interface 206 to enable communication between the two components of system 200. As should be appreciated, the internal user interface 206 may access the invoice reconciliation tool 204 via any suitable interface or application architecture either now known or later developed.

Internal user interface 206 may provide one or more windows (or graphical user interfaces) for interacting with the invoice reconciliation tool 204. For instance, the internal user interface 206 may include one or more menus, toolbars, ribbons, or tabs for selecting different workflows associated with an invoice. The selectable options may include, for example, an invoice search 226, a basic audit workflow 228, a charge audit workflow 230, or an administrative maintenance interface 232 (e.g., for editing or reviewing charge rates, allowed variances, ELC calculations, bank holiday lists, and the like). Upon receiving a selected option, the internal user interface 206 may provide a window (or graphical user interface) associated with the selection.

For instance, upon receiving a selection for an invoice search 226, the window may be tailored to provide different option and features for conducting the invoice search. The invoice search window may provide menus, toolbars, ribbons, or tabs with different options for searching invoices. Options may include, for example, searching by invoice number (or invoice ID), landed date (or date range), landed cost (or cost range), vendor (or vendor ID), PO number, load date (or date range), draft ID, and the like. In providing functionality for performing the invoice search, the internal interface 206 may also access the external interfaces 202 to obtain current data regarding any of the dates, identifiers, costs, etc., utilized as search criteria.

Alternatively, selection of a basic audit workflow 228 or a charge audit workflow 230 may launch windows tailored for conducting a basic audit or a charge audit of the invoice, respectively. Such audit windows may also include menus, toolbars, ribbons, or tabs with different options for auditing invoices, such as for retrieving current data from external sources (e.g., via the one or more external interfaces 202), for identifying variances or discrepancies, resolving discrepancies, and the like.

Further still, selection of an administrative maintenance interface 232 may provide options for viewing or editing charge rates, bank holidays, international carrier lists, allowable variances, and the like. In providing functionality for performing administrative maintenance, the internal interface 206 may also access the external interfaces 202 to obtain current data regarding any of the rates, holidays, carrier lists, allowable variances, etc., identified as options for performing administrative maintenance. The administrative maintenance interface 232 may also provide approval override functionality, e.g., for internal finance employees with elevated administrative permissions.

In some embodiments the system 200 may be implemented by and/or in communication with one or more computing devices (not shown) over a network (not shown). In some cases, system 200 may be implemented over a distributed system of computing devices, storage resources, and networks (e.g., a cloud-based environment). The network(s) can be any of a variety of public and/or private communications networks, such as the Internet, an enterprise intranet or other private network, or any combination thereof. The computing device can be any network-connected device including a desktop computer, laptop computer, tablet computing device, smartphone, or any other device capable of connecting to the network through wireless or wired connections. An example computing architecture of system 200 will be further illustrated and described with respect to FIGS. 4 and 5.

As should be appreciated, the various devices, components, etc., described with respect to FIG. 2 are not intended to limit the systems and methods to the particular components described. Accordingly, additional topology configurations may be used to practice the methods and systems herein and/or some components described may be excluded without departing from the methods and systems disclosed.

Figure 3:
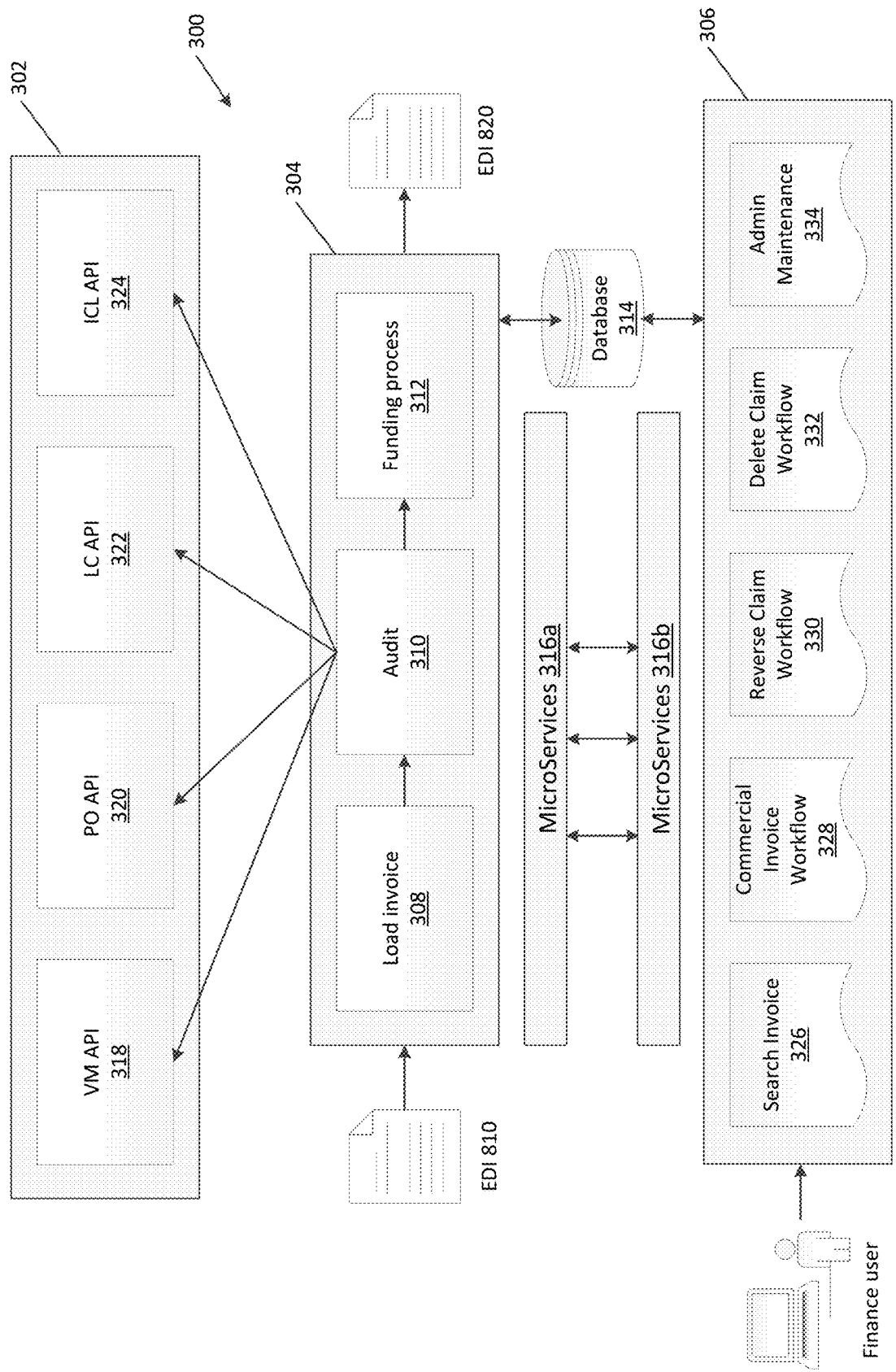
FIG. 3 illustrates an alternative example block diagram of a system usable for processing an invoice from an overseas vendor.

FIG. 3 illustrates a schematic diagram of an example system 300 for processing invoices from overseas vendors, which may include carrier duties and charges. Similar to system 200, the components of the invoice processing system 300 include one or more external interfaces 302

(including application programming interfaces, or "APIs," for retrieving current invoice data from external sources), invoice reconciliation tool 304, and internal user interface 306. Together, the one or more external interfaces 302, invoice reconciliation tool 304, and internal user interface 306 operate to process invoices received from overseas vendors. For example, such invoices may be in the form of "EDI 810" (i.e., electronic invoice).

In aspects, an invoice (e.g., EDI 810) may be received from an overseas vendor at the invoice reconciliation tool 304. The invoice may include, for instance, at least one billed item, a billed price, a billed quantity, and a billed landed cost ("LC"). As with the invoice reconciliation tool 204, the invoice reconciliation tool 304 may include a number of stages or components. For instance, upon receipt, the invoice may be loaded 308 into the invoice reconciliation tool 304. The invoice may then advance to an audit stage 310. At the audit stage 310, the invoice reconciliation tool 304 may access the one or more external interfaces 302 to retrieve current data from external sources in order to reconcile billed items and charges associated with the invoice.

As with system 200, upon retrieval, the current data may populate (or update) a single local database 314 corresponding to a "single source of truth" for invoice data. The current data may be retrieved in real time each time an audit is conducted for an invoice. Alternatively, current data may be retrieved only when changes or updates are detected between the data reflected in the local database 314 and the current data maintained by the external sources. In some cases, rather than retrieving current data in real time, the current data may be retrieved according to a predefined schedule or may be retrieved any time changes are detected based on periodically pinging the one or more external interfaces 302. As should be appreciated, current data may be retrieved according to any of the methods described above or any combination thereof.

Current data retrieved for an audit may include, for instance, current data regarding one or more ordered items (from the vendor) and/or one or more landed items (at a domestic flow center), including item identifier(s), item quantity, item type (e.g., item size, item color, item manufacturer and/or distributor, etc.), item received condition (e.g., open box, damaged, destroyed, good, fair, etc.), an ELC (or ALC, if available), an agreed price for the ordered items, payment terms, an ELC, an ALC (if available), allowable variances (e.g., associated with item type, item quantity, item quality or condition, freight costs, etc.), and the like.

The one or more external interfaces 302 for retrieving current data may include, for instance, a vendor management ("VM") API 318, a purchase order ("PO") API 320, a landing cost ("LC") API 322, and an International Carrier List ("ICL") API 324. The VM API 318 may provide access to current data associated with the vendor, including quantity and types of ordered items, quantity and types of items delivered to an overseas consolidation center, overseas load date, inland carrier routes and costs, taxes and duties, vendor banking information, wiring instructions, and the like. The PO API 222 may provide access to current data regarding a purchase order for items ordered and/or shipped from the vendor (e.g., in the form of EDI 850) and may include any change orders to the PO (e.g., in the form of EDI 860). Further, when the ordered items have been received (or "landed") at a domestic flow center, the PO API 222 may provide access to the actual landed cost ("ALC") for the goods. Alternatively or additionally, the ALC may be retrieved from LC API 322, which may provide updated ALC data as soon as items are received (landed) at the domestic flow center. The ICL API 324 may provide access to current data regarding international carriers, such as carrier identifiers, current carrier rates, carrier routes and schedules, carrier vessels, and the like. As should be appreciated, the external interfaces identified above, as well as other external interfaces, may be accessed by the invoice reconciliation tool 304 at different times and for different reasons. For instance, the invoice reconciliation tool 304 may also access other external interfaces (not shown), such as an Overseas Transportation Manager ("OTM") API, and the like.

In this way, auditing and processing invoices is improved by leveraging access to the one or more external interfaces 302 to retrieve current data, which may be maintained in a single local database 314 as a "single source of truth" for invoice data. Previously, due to the extended transit period and multiple (sometimes unforeseen) events between generating the purchase order and actually receiving the ordered goods, reconciling invoices from overseas vendors was challenging. In fact, the multiple events may be associated with different entities, including vendors, duty brokers, customs agencies, consolidators, deconsolidators, carriers, etc., and the data associated with such events may be generated by such entities or other entities (e.g., brokers). Not only so, but data associated with the different events may be relayed to different components of an enterprise system, e.g., a PO module, an inventory module, an order tracking module, a finance module, etc. The receipt and storage of data in different locations created multiple points of failure and increased the likelihood of outdated data across the various locations. Rather, the present systems retrieve and rely on current data from the most accurate or up-to-date sources of such data, and then store the data in a single location. As a result, errors and time for processing overseas invoices are reduced because accurate data is more readily and promptly available to reconcile discrepancies and pay the invoices.

After successfully completing the audit stage 310, if approved, the invoice may advance to a funding process 312. At funding process 312, approved invoices are processed for payment (or funding). During funding process 312, approved funding amount, invoice identifier, vendor banking information, wiring instructions, and the like, are populated into an EDI 820, which is an electronic payment order or remittance advice for the invoice. Upon generating and forwarding the EDI 820 for funding, invoice processing is complete.

As further illustrated by system 300, the invoice reconciliation tool 304 may further be accessed by the internal user interface 306. Internal user interface 306 enables users (e.g., internal finance employees or finance users) to monitor, review, approve, and otherwise interact with the invoice reconciliation tool 304. Internal user interface 306 may access the invoice reconciliation tool 304 via a set of MicroServices 316a/316b. MicroServices 316a/316b may be associated with either or both of the invoice reconciliation tool 304 and/or the internal user interface 306 to enable communication between the two components of system 300. As should be appreciated, the internal user interface 306 may access the invoice reconciliation tool 304 via any suitable interface or application architecture either now known or later developed.

Internal user interface 306 may provide one or more windows for interacting with the invoice reconciliation tool 304. For instance, the internal user interface 306 may include one or more menus, toolbars, ribbons, or tabs for selecting different workflows associated with an invoice. The selectable options may include, for example, an invoice search 326, a commercial invoice (or audit) workflow 328, a reverse claim workflow 330, a delete claim workflow 332, or an administrative maintenance interface 334 (e.g., for editing or reviewing charge rates, allowed variances, bank holiday lists, updating vendor information, and the like). Upon receiving a selected option, the internal user interface 306 may provide a window (or graphical user interface) associated with the selection.

For instance, upon receiving a selection for an invoice search 326, the window may be tailored to provide different option and features for conducting the invoice search. The invoice search window may provide menus, toolbars, ribbons, or tabs with different options for searching invoices. Options may include, for example, searching by vendor name or vendor identifier (vendor ID), invoice number or invoice ID, landed date (or date range), landed cost (or cost range), PO number, invoice status, draft ID, and the like. In providing functionality for performing the invoice search, the internal interface 306 may also access the external interfaces 302 to obtain current data regarding any of the dates, identifiers, costs, etc., utilized as search criteria.

Alternatively, selection of a commercial invoice (or audit) workflow 328 may launch windows tailored for auditing the invoice. The audit window may also include menus, toolbars, ribbons, or tabs with different options for auditing invoices, including retrieving current data from external sources (e.g., via the one or more external interfaces 302), identifying and resolving variances or discrepancies, entering payment summaries or notes, approving the invoice, and the like.

Selection of a reverse claim workflow 330 and/or a delete claim workflow 332 may launch a window or windows for processing claims. As used herein, a claim is a variance or discrepancy against the invoice, for example, a discrepancy between an ordered item and a landed item, a discrepancy between an ordered quantity and a landed quantity, a discrepancy between an agreed price and a billed price, and the like. In providing functionality for performing claim processing, the internal interface 306 may also access the external interfaces 302 to obtain current data regarding any of the items, quantities, dates, prices, costs, etc., identified in the options for processing claims above. Thus, the reverse claim workflow 330 and/or the delete claim workflow 332 enable a user to address (i.e., resolve) discrepancies between the invoice and current data. Upon resolving any discrepancies, the invoice can be approved for funding, thereby advancing the invoice to funding process 312 (described above). Alternatively, when a discrepancy cannot be resolved, the invoice may not be approved for payment and one or more alternative actions may be taken with respect to the invoice, e.g., invoice escalation, negotiation with the vendor, partial payment, and the like.

Selection of an administrative maintenance interface 334 may provide options for setting up additional vendors or editing vendor information, viewing or editing charge rates, bank holidays, international carrier lists, allowable variances, and the like. In providing functionality for performing administrative maintenance, the internal interface 306 may also access the external interfaces 302 to obtain current data regarding any of the rates, holidays, carrier lists, allowable variances, etc., identified in the options for performing administrative maintenance above. The administrative maintenance interface 334 may also provide approval override options, e.g., for internal finance employees with elevated administrative permissions.

In some embodiments the system 300 may be implemented by and/or in communication with one or more computing devices (not shown) over a network (not shown). In some cases, system 300 may be implemented over a distributed system of computing devices, storage resources, and networks (e.g., a cloud-based environment). The networks can be any of a variety of public and/or private communications networks, such as the Internet, an enterprise intranet or other private network, or any combination thereof. The computing device can be any network-connected device including a desktop computer, laptop computer, tablet computing device, smartphone, or any other device capable of connecting to the network through wireless or wired connections. An example computing architecture of system 300 will be further illustrated and described with respect to FIGS. 4 and 5.

As should be appreciated, the various devices, components, etc., described with respect to FIG. 3 are not intended to limit the systems and methods to the particular components described. Accordingly, additional topology configurations may be used to practice the methods and systems herein and/or some components described may be excluded without departing from the methods and systems disclosed.

Figure 4:
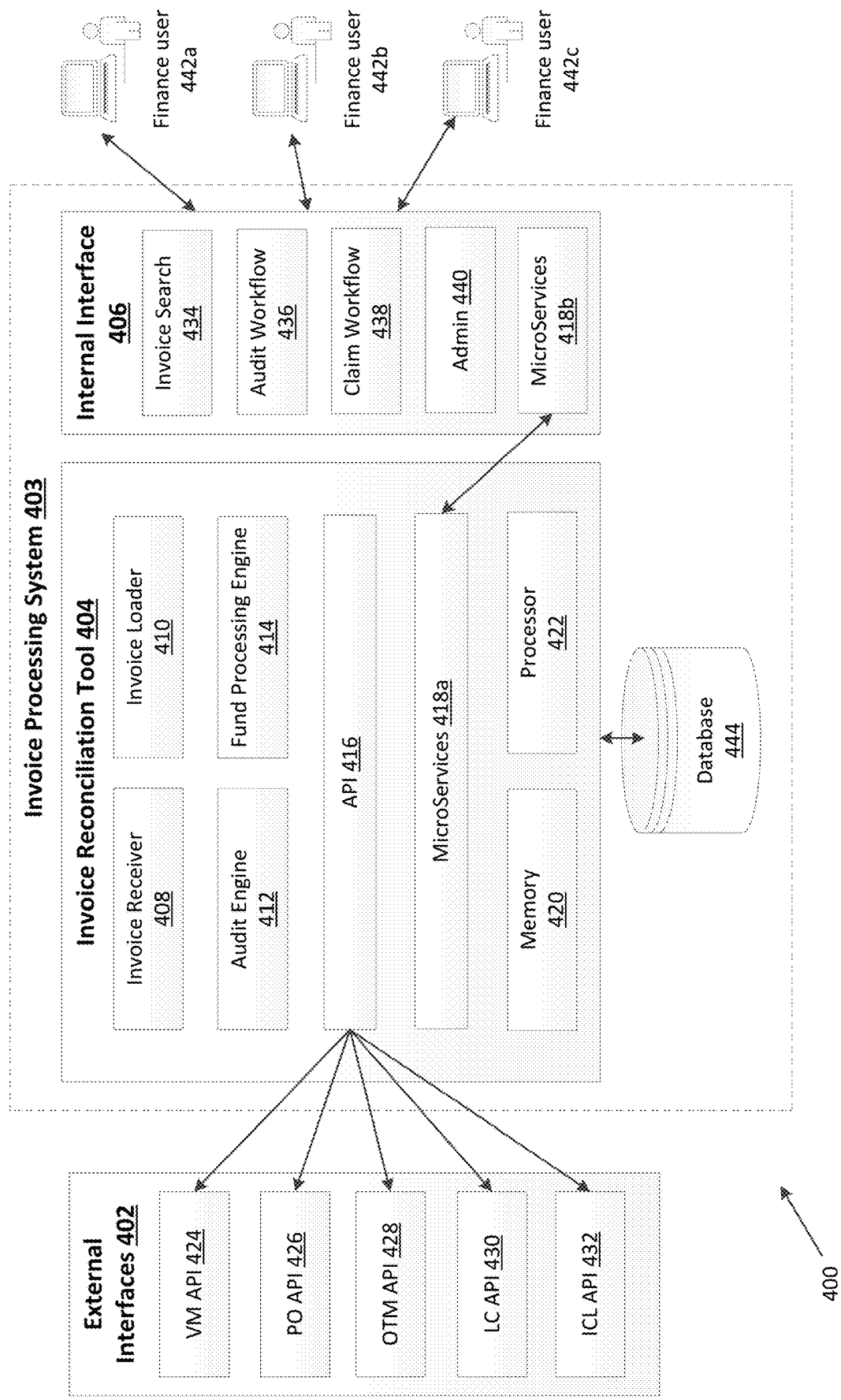
FIG. 4 illustrates an example block diagram of a computing system usable in the invoice processing systems of FIGS. 2 and 3.

FIG. 4 shows a more detailed schematic of systems 200 and 300. Computer system 400 includes an invoice processing system 403, which may be implemented by a retail enterprise and includes local components encompassed by a dashed line. The invoice processing system 403 may include an invoice reconciliation tool 404, an internal interface 406, and a database 444. The invoice processing system 403 also includes a processor 422 and memory 420 operatively and communicatively coupled to the processor 422. One or more finance users 442a/442b/442c may interact with the invoice processing system 403 via the internal interface 406, and the internal interface 406 may interact with the invoice reconciliation tool 404 via MicroServices 418a/418b. Additionally, the invoice processing system 403 may communicate via API 416 with external interfaces 402, which interfaces may provide access to current data from external sources.

The invoice processing system 403 receives an invoice (e.g., an EDI 210 or an EDI 810) from a carrier or a vendor at invoice receiver 408. In response to receiving the invoice, invoice receiver 408 may pass the invoice to invoice loader 410. Invoice loader 410 may then load the invoice into the invoice reconciliation tool 404 for processing. For instance, the invoice may pass to the audit engine 412 for identifying and reconciling any discrepancies. In order to reconcile the invoice, audit engine 412 may access one or more external interfaces 402, e.g., via API 416, to retrieve current invoice data from external sources. For instance, audit engine 412 may access a VM API 424, a PO API 426, an OTM API 428, a LC API 430, and/or an ICL API 432.

As detailed above, the VM API 424 may provide access to current data associated with the vendor, including quantity and types of ordered items, quantity and types of items delivered to an overseas consolidation center, overseas load date, inland carrier routes and costs, taxes and duties, vendor banking information, wiring instructions, and the like. The PO API 426 may provide access to current data regarding a purchase order for items ordered from the vendor (e.g., in the form of EDI 850) and may include any change orders to the PO (e.g., in the form of EDI 860). Further, when the ordered items have been received at a domestic flow center, the PO API 426 may provide access to the actual landed cost ("ALC") for the goods. Alternatively or additionally, the ALC may be retrieved from LC API 430, which may provide updated ALC data as soon as items are received at the domestic flow center. The OTM API 224 may provide access to current data regarding OFPs, which may have been made, are pending, or are due. OFP data may include the carrier's foreign or domestic bank information, bank holiday information, wiring instructions, current currency exchange rates, and the like. Additionally or alternatively, if available, the OTM API 224 may provide access to the ALC of items delivered to a domestic flow center. The ICL API 432 may provide access to current data regarding international carriers, such as carrier identifiers, current carrier rates, carrier routes and schedules, carrier vessels, and the like. As should be appreciated, the external interfaces 402 identified above, as well as other external interfaces, may be accessed by the audit engine 412 at different times and for different reasons.

As detailed above, current data may be retrieved in real time when audit engine 412 processes an invoice. Alternatively, upon retrieval, the current data may populate (or update) a local database 444 corresponding to a "single source of truth" for invoice data. Alternatively still, current data may be retrieved only when changes or updates are detected between the data reflected in the database 444 and the current data maintained by the external sources. In some cases, rather than retrieving current data in real time, the current data may be retrieved according to a predefined schedule (e.g., every night, every morning, every Monday, etc.) or may be retrieved any time changes are detected based on periodically pinging the one or more external interfaces 402. As should be appreciated, current data may be retrieved according to any of the methods described above or any combination thereof.

After processing by the audit engine 412, if no discrepancies are identified, or if identified discrepancies are reconciled, the invoice may be approved for payment and may pass to fund processing engine 414. At fund processing engine 414, the funding amount, invoice identifier, vendor banking information, wiring instructions, and the like, may be populated into an EDI 820, which is an electronic payment order or remittance advice for the invoice. Upon generating and forwarding the EDI 820 for funding, invoice processing is completed for the invoice.

As further detailed above, finance users 442a/442b/442c may access internal interface 406 to monitor, review, approve, and otherwise interact with the invoice reconciliation tool 404. For instance, internal interface 406 may access the invoice reconciliation tool 404 via a set of MicroServices 418a/418b. As should be appreciated, the internal interface 406 may access the invoice reconciliation tool 404 via any suitable interface or application architecture either now known or later developed. Internal interface 406 may provide one or more windows for interacting with the invoice reconciliation tool 404. For instance, the internal interface 406 may include one or more menus, toolbars, ribbons, or tabs for selecting different workflows associated with an invoice. The selectable options may include, for example, an invoice search 434, an audit workflow 436, a claim workflow 438, or an administrative maintenance interface 440.

Upon receiving a selected option, the internal interface 406 may provide a window (or graphical user interface) associated with the selection. For instance, upon receiving a selection for an invoice search 434, the window may be tailored to provide different option and features for conducting the invoice search. The invoice search window may provide menus, toolbars, ribbons, or tabs with different options for searching invoices. Options may include, for example, searching by invoice number (or invoice ID), landed date (or date range), landed cost (or cost range), vendor (or vendor ID), PO number, load date (or date range), draft ID, and the like. In providing functionality for performing the invoice search, the internal interface 406 may also access the external interfaces 402 to obtain current data regarding any of the dates, identifiers, costs, etc., utilized as search criteria.

Alternatively, selection of an audit workflow 436 may launch windows tailored for auditing the invoice. The audit window may also include menus, toolbars, ribbons, or tabs with different options for auditing invoices, including retrieving current data from external sources (e.g., via the one or more external interfaces 402), identifying and resolving discrepancies, entering payment summaries or notes, approving the invoice, and the like.

Selection of a claim workflow 438 may launch a window or windows for processing claims. In providing functionality for performing claim processing, the internal interface 406 may also access the external interfaces 402 to obtain current data regarding any of the items, quantities, dates, prices, costs, etc., identified in the options for processing claims above. Thus, the claim workflow 438 enables a user to address (i.e., resolve) discrepancies between the invoice and current data. Upon resolving any discrepancies, the invoice can be approved for funding, thereby advancing the invoice to fund processing engine 414 (described above). Alternatively, when a discrepancy cannot be resolved, the invoice may not be approved for payment and one or more alternative actions may be taken with respect to the invoice, e.g., invoice escalation, negotiation with the vendor, partial payment, and the like.

Selection of administration 440 may provide options for setting up additional vendors or editing vendor information, viewing or editing charge rates, bank holidays, international carrier lists, allowable variances, and the like. In providing functionality for performing administrative functions, the internal interface 406 may also access the external interfaces 402 to obtain current data regarding any of the rates, holidays, carrier lists, allowable variances, etc., identified in the options for performing administrative functions above. The administration 440 may also provide approval override options, e.g., for internal finance employees with elevated administrative permissions.

In some embodiments the computing system 400 may be implemented over a network (not shown). For instance, computing system 400 may be implemented over a distributed system of computing devices, storage resources, and networks (e.g., a cloud-based environment). The network(s) can be any of a variety of public and/or private communications networks, such as the Internet, an enterprise intranet or other private network, or any combination thereof. Computing devices within the architecture of computing system 400 can be any network-connected device including a desktop computer, laptop computer, tablet computing device, smartphone, or any other device capable of connecting to the network through wireless or wired connections. An example computing architecture of computing system 400 will be further illustrated and described with respect to FIG. 5.

As should be appreciated, the various devices, components, etc., described with respect to FIG. 4 are not intended to limit the systems and methods to the particular components described. Accordingly, additional topology configurations may be used to practice the methods and systems herein and/or some components described may be excluded without departing from the methods and systems disclosed.

Figure 5:
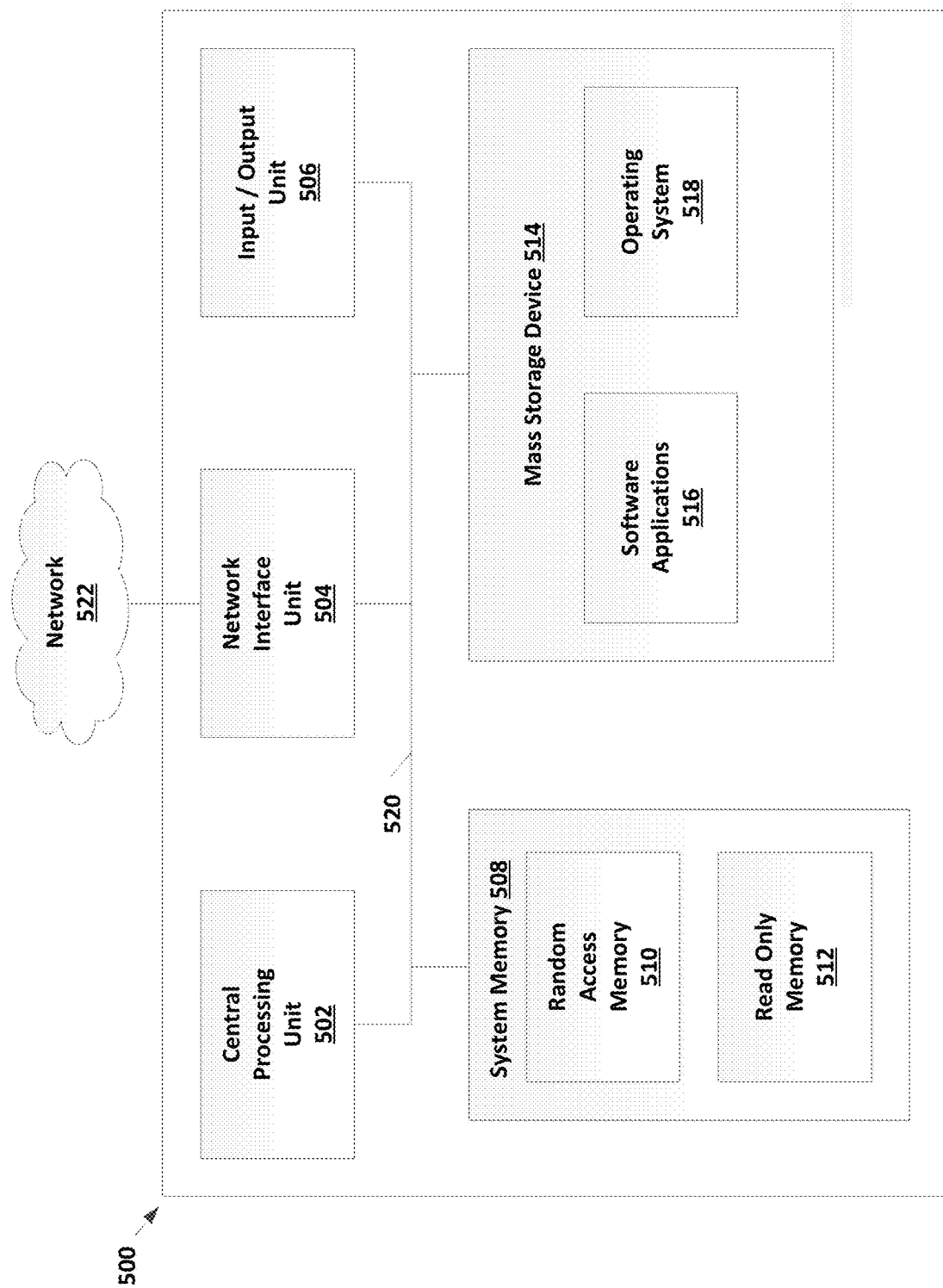
FIG. 5 illustrates an example block diagram of a computing system usable in the invoice processing systems of FIGS. 2, 3 and 4.

Referring now to FIG. 5, an example block diagram of a computing system 500 is shown that is usable to implement aspects of the invoice processing systems of FIGS. 2, 3 and 4. In the embodiment shown, the computing system 500 includes at least one central processing unit ("CPU") 502, a system memory 508, and a system bus 520 that couples the system memory 508 to the CPU 502. The system memory 508 includes a random access memory ("RAM") 510 and a read-only memory ("ROM") 512. A basic input/output system that contains the basic routines that help to transfer information between elements within the computing system 500, such as during startup, is stored in the ROM 512. The computing system 500 further includes a mass storage device 514. The mass storage device 514 is able to store software instructions (e.g., software applications 516 and/or operating system 518) and other data.

The mass storage device 514 is connected to the CPU 502 through a mass storage controller (not shown) connected to the system bus 520. The mass storage device 514 and its associated computer-readable storage media provide non-volatile, non-transitory data storage for the computing system 500. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 502 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 500.

According to various embodiments, the computing system 500 may operate in a networked environment using logical connections to remote network devices through a network 522, such as a wireless network, the Internet, or another type of network. The computing system 500 may connect to the network 522 through a network interface unit 504 connected to the system bus 520. It should be appreciated that the network interface unit 504 may also be utilized to connect to other types of networks and remote computing systems. The computing system 500 also includes an input/output unit 506 for receiving and processing input from a number of other devices, including a touch user interface display screen, or another type of input device. Similarly, the input/output unit 506 may provide output to a touch user interface display screen or other type of output device.

As mentioned briefly above, the mass storage device 514 and the RAM 510 of the computing system 500 can store software instructions and data. The software instructions include an operating system 518 suitable for controlling the operation of the computing system 500. The mass storage device 514 and/or the RAM 510 also store software instructions (e.g., software applications 516), that when executed by the CPU 502, cause the computing system 500 to provide the functionality discussed in this document. For example, the mass storage device 514 and/or the RAM 510 can store software instructions that, when executed by the CPU 502, cause the computing system 500 to receive invoices and retrieve current data from external sources to process and reconcile the invoices for payment.

Figure 6:
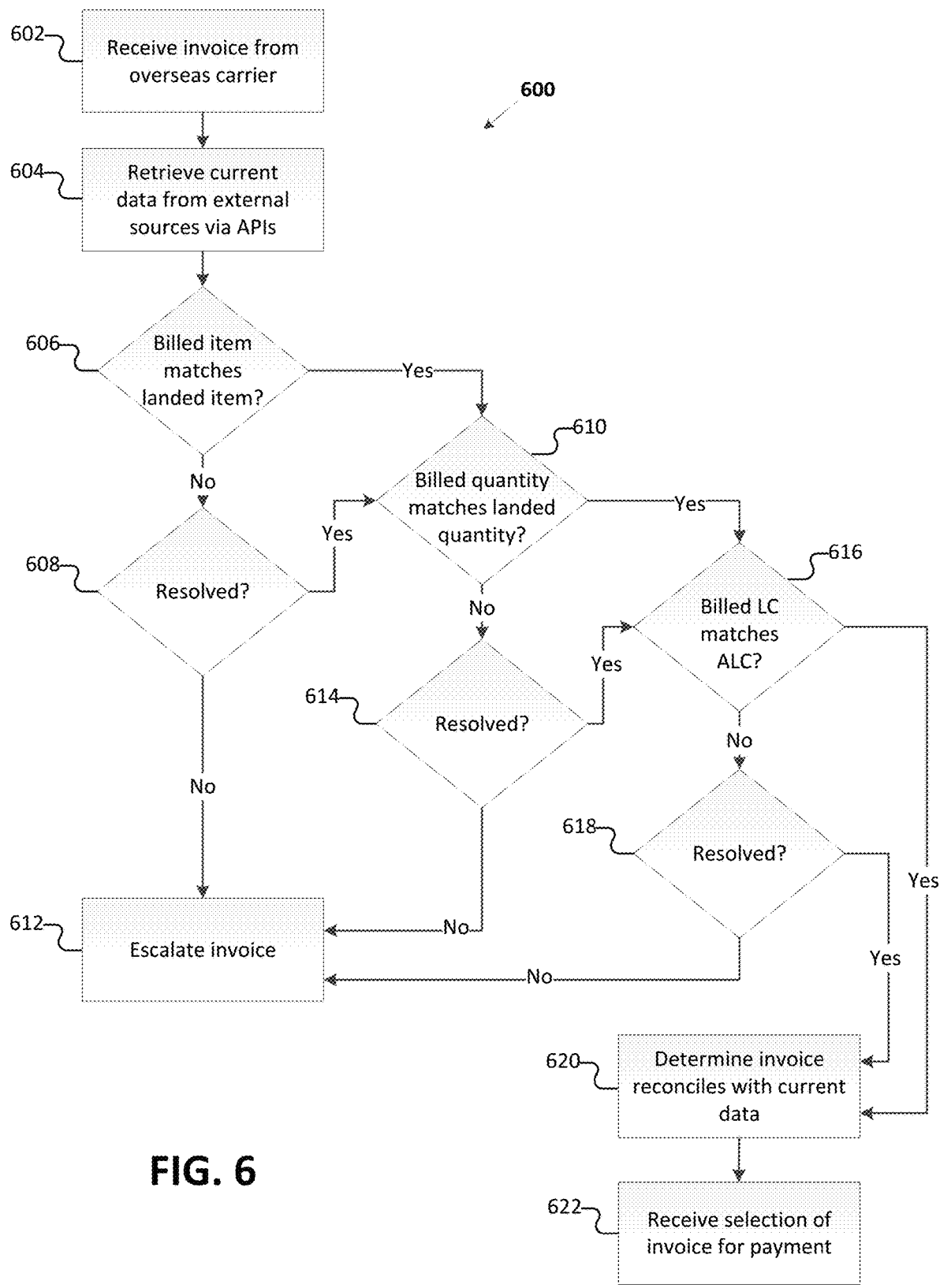
FIG. 6 provides a flow diagram of a method of reconciling an invoice from an overseas carrier.

Referring now to FIG. 6, which provides a flow diagram of a method of reconciling an invoice from an overseas carrier. For instance, the method of FIG. 6 may correspond to the system architecture for an invoice processing system described with respect to FIG. 2.

At operation 602, an invoice is received from an overseas carrier. For instance, the invoice may be in the form of an electronic invoice (e.g., EDI 210) and may include at least one billed item, a billed item quantity, and a billed landed cost ("LC"). The invoice may be received and loaded into a software tool, such as the invoice reconciliation tool 204/304/404, described above.

At operation 604, current data may be retrieved from one or more external sources using different application programming interfaces ("APIs"). The current data may reflect the most up-to-date and accurate data available for the invoice. For example, the current data may include a purchase order matching the invoice and reflecting current data for at least one shipped item, a shipped quantity, and an estimated landed cost ("ELC"). Additionally or alternatively, the current data may include a receipt for goods associated with the invoice that were received (or landed) at a distribution center, the receipt reflecting current data for at least one landed item and a landed quantity. Additionally or alternatively, the current data may include an actual landed cost ("ALC") for the landed item and the landed quantity. In some cases, the retrieved current data may be stored in a single local database as a "single source of truth" for reconciling invoices.

At operation 606, the billed item identified on the invoice may be compared to the landed item reflected on the receipt. If the billed item matches the landed item, the method may progress to operation 610. Alternatively, if the billed item does not match the landed item, a discrepancy may be identified and the method may progress to operation 608.

At operation 608, it may be determined whether the item discrepancy can be resolved. In some cases, the discrepancy may fall within an allowable variance and the discrepancy can be resolved automatically or manually by a finance user. If the discrepancy can be resolved, the method may progress to operation 610. In other cases, the discrepancy may fall outside allowable variances. For instance, an identifier for the billed item may not match the landed item—indicating that the landed item is a different item or item type than the billed item. Alternatively, the billed item may not be reflected on the receipt at all—indicating that the billed item either was never shipped, or was damaged, destroyed or lost on route. In this case, the discrepancy may not be resolved. If the discrepancy cannot be resolved, the method may progress to operation 612.

At operation 610, the billed quantity identified on the invoice may be compared to the landed quantity reflected on the receipt. If the billed quantity matches the landed quantity, the method may progress to operation 616. Alternatively, if the billed quantity does not match the landed quantity, a discrepancy may be identified and the method may progress to operation 614.

At operation 612, when the discrepancy cannot be resolved, the invoice may be escalated. Escalation of the invoice may involve rejecting the invoice, partially paying the invoice, forwarding the invoice to a finance manager for further review, holding the invoice, or other action.

At operation 614, it may be determined whether the quantity discrepancy can be resolved. In some cases, the discrepancy may fall within an allowable variance and the discrepancy can be resolved automatically or manually by a finance user. If the discrepancy can be resolved, the method may progress to operation 616. In other cases, the discrepancy may fall outside allowable variances. For instance, the billed quantity may be substantially different from the landed quantity—indicating that at least some items were never shipped, or were damaged, destroyed or lost on route. In this case, the discrepancy may not be resolved. If the discrepancy cannot be resolved, the method may progress to operation 612.

At operation 616, the billed LC identified on the invoice may be compared to the ALC reflected by the current data. If the billed LC matches the ALC, the method may progress to operation 620. Alternatively, if the billed LC does not match the ALC, a discrepancy may be identified and the method may progress to operation 618.

At operation 618, it may be determined whether the LC discrepancy can be resolved. In some cases, the discrepancy may fall within an allowable variance and the discrepancy can be resolved automatically or manually by a finance user. If the discrepancy can be resolved, the method may progress to operation 620. In other cases, the discrepancy may fall outside allowable variances. For instance, the billed LC may be substantially different from the ALC—indicating that an ELC was improperly calculated at the time of purchase order or that the carrier failed to update the ELC with the ALC prior to generating the invoice. In this case, the discrepancy may not be resolved. If the discrepancy cannot be resolved, the method may progress to operation 612.

At operation 620, upon auditing the invoice and either finding no discrepancies or resolving identified discrepancies, it may be determined that the invoice reconciles with the current data. In aspects, as a result of relying on current data to reconcile the invoice from the overseas carrier, the invoice may be more quickly processed with fewer chances for error.

At operation 622, upon successfully auditing the invoice and determining that the invoice reconciles with the current data, a selection may be received for paying the invoice. For instance, a finance user may approve and select the invoice for payment or funding.

As should be appreciated, operations 602-622 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 7:
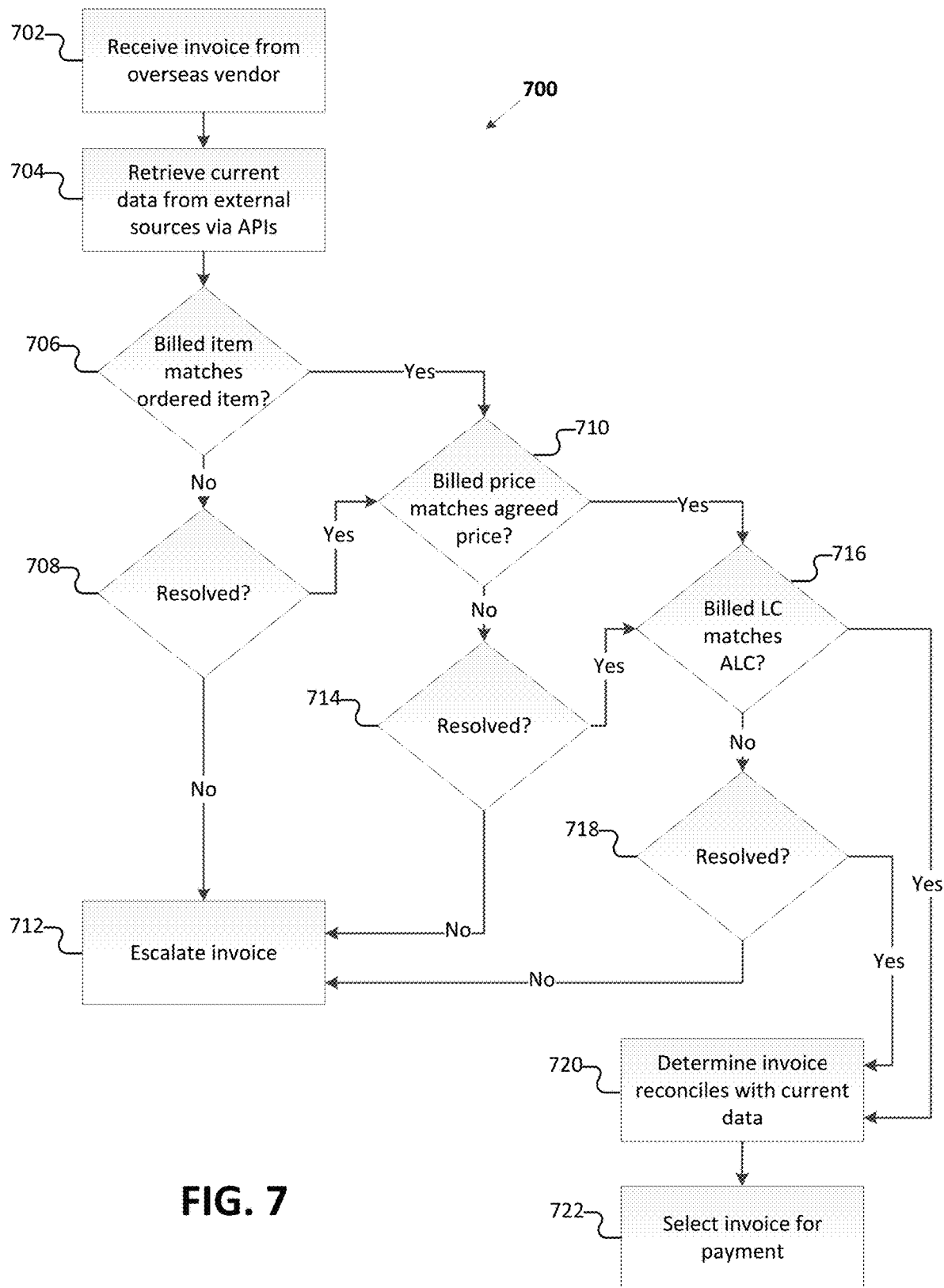
FIG. 7 provides a flow diagram of a method of reconciling an invoice from an overseas vendor.

Referring now to FIG. 7, which provides a flow diagram of a method of reconciling an invoice from an overseas vendor. For instance, the method of FIG. 6 may correspond to the system architecture for an invoice processing system described with respect to FIG. 3.

At operation 702, an invoice is received from an overseas vendor. For instance, the invoice may be in the form of an electronic invoice (e.g., EDI 810) and may include at least one billed item, a billed price, a billed quantity, and a billed landed cost ("LC"). The invoice may be received and loaded into a software tool, such as the invoice reconciliation tool 204/304/404, described above.

At operation 704, current data may be retrieved from one or more external sources using different application programming interfaces ("APIs"). The current data may reflect the most up-to-date and accurate data available for the invoice. For example, the current data may include a purchase order matching the invoice and reflecting current data for at least one ordered item, an agreed price, an ordered quantity, and an estimated landed cost ("ELC"). Additionally or alternatively, the current data may include a receipt for goods associated with the invoice that were received (or landed) at a distribution center, the receipt may reflect current data for at least one landed item and a landed quantity. Additionally or alternatively, the current data may include an actual landed cost ("ALC") for the landed item and the landed quantity. In some cases, the retrieved current data may be stored in a single local database as a "single source of truth" for reconciling invoices.

At operation 706, the billed item identified on the invoice may be compared to the ordered item reflected on the purchase order. If the billed item matches the ordered item, the method may progress to operation 710. Alternatively, if the billed item does not match the ordered item, a discrepancy may be identified and the method may progress to operation 708.

At operation 708, it may be determined whether the item discrepancy can be resolved. In some cases, the discrepancy may fall within an allowable variance and the discrepancy can be resolved automatically or manually by a finance user. If the discrepancy can be resolved, the method may progress to operation 710. In other cases, the discrepancy may fall outside allowable variances. For instance, an identifier for the billed item may not match the ordered item—indicating that the billed item is a different item or item type than the ordered item. Alternatively, the billed item may not be reflected on the receipt at all—indicating that the billed item either was never shipped, or was damaged, destroyed or lost on route. In this case, the discrepancy may not be resolved. If the discrepancy cannot be resolved, the method may progress to operation 712.

At operation 710, the billed price identified on the invoice may be compared to the agreed price reflected on the purchase order. If the billed price matches the agreed price, the method may progress to operation 716. Alternatively, if the billed price does not match the agreed price, a discrepancy may be identified and the method may progress to operation 714.

At operation 712, when the discrepancy cannot be resolved, the invoice may be escalated. Escalation of the invoice may involve rejecting the invoice, partially paying the invoice, forwarding the invoice to a finance manager for further review, holding the invoice, or other action.

At operation 714, it may be determined whether the price discrepancy can be resolved. In some cases, the discrepancy may fall within an allowable variance and the discrepancy can be resolved automatically or manually by a finance user. If the discrepancy can be resolved, the method may progress to operation 716. In other cases, the discrepancy may fall outside allowable variances. For instance, the billed price may be substantially different than the agreed price. In this case, the discrepancy may not be resolved. If the discrepancy cannot be resolved, the method may progress to operation 712.

At operation 716, the billed LC identified on the invoice may be compared to the ALC reflected by the current data. If the billed LC matches the ALC, the method may progress to operation 720. Alternatively, if the billed LC does not match the ALC, a discrepancy may be identified and the method may progress to operation 718.

At operation 718, it may be determined whether the LC discrepancy can be resolved. In some cases, the discrepancy may fall within an allowable variance and the discrepancy can be resolved automatically or manually by a finance user. If the discrepancy can be resolved, the method may progress to operation 720. In other cases, the discrepancy may fall outside allowable variances. For instance, the billed LC may be substantially different from the ALC—indicating that an ELC was improperly calculated at the time of purchase order or that the carrier failed to update the ELC with the ALC prior to generating the invoice. In this case, the discrepancy may not be resolved. If the discrepancy cannot be resolved, the method may progress to operation 712.

At operation 720, upon auditing the invoice and either finding no discrepancies or resolving identified discrepancies, it may be determined that the invoice reconciles with the current data. In aspects, as a result of relying on current data to reconcile the invoice from the overseas vendor, the invoice may be more quickly processed with fewer chances for error.

At operation 722, upon successfully auditing the invoice and determining that the invoice reconciles with the current data, a selection may be received for paying the invoice. For instance, a finance user may approve and select the invoice for payment or funding.

As should be appreciated, operations 702-722 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 8:
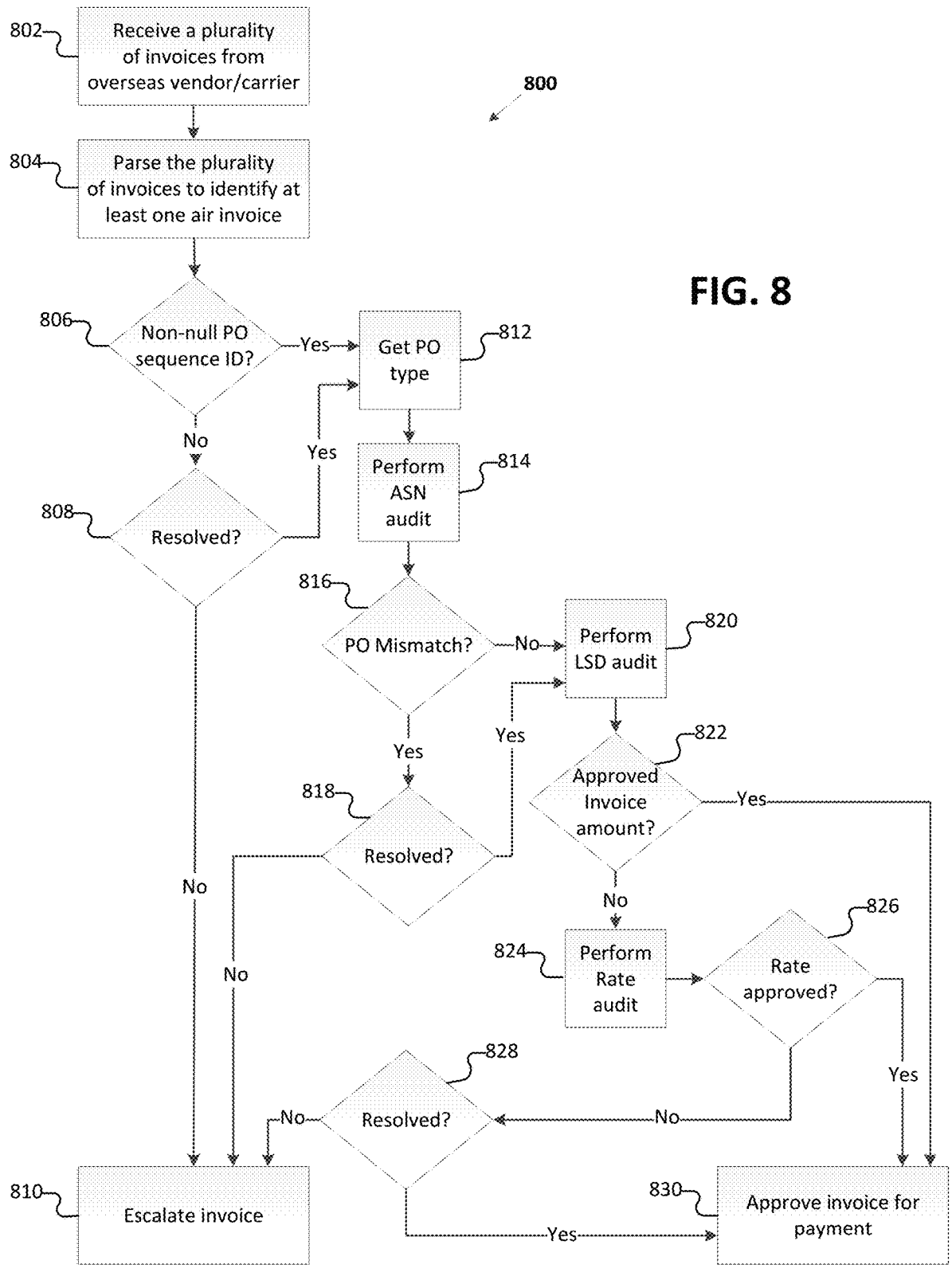
FIG. 8 provides a flow diagram of a method of reconciling an air invoice.

FIG. 8 provides a flow diagram of a method of reconciling an air invoice.

At receive operation 802, a plurality of invoices are received (e.g., from overseas carriers). For instance, the plurality of invoices may be in the form of electronic invoices (e.g., EDI 210) and may each include one or more of: a PO number, a bill of lading ("BOL") number, a carrier name, a billed landed cost ("LC"), a billed rate and/or an invoice amount, among others. The invoices may be received and loaded into a software tool, such as the invoice reconciliation tool 204/304/404, described above.

At parse operation 804, the plurality of invoices may be parsed to identify at least one invoice from an air carrier (e.g., air carrier invoice). For example, the carrier name of the at least one invoice may be compared to an air carrier list to identify the at least one air carrier invoice.

At determination operation 806, it may be determined whether a PO number (e.g., a PO sequence identifier) exists for the at least one air carrier invoice. If the PO number exists (e.g., is non-null), the method may progress to type operation 812. If the PO number does not exist (e.g., null), the method may progress to resolution operation 808.

A type operation 812, a PO type may be determined from the PO number. For example, the PO type may be a ship notice type PO or a non-retail type PO. For a ship notice type PO, a company code, a sub-company code, and a payment due date may be determined from the PO type. In response to determining the PO type, the method may progress to ASN audit 814.

At resolution operation 808, it may be determined whether the null PO number can be resolved. For instance, the PO number may be entered manually by a finance user or manager. If the null PO number can be resolved, the method may progress to type operation 812. If the null PO number cannot be resolved, the method may progress to escalate operation 810.

At escalate operation 810, when the discrepancy cannot be resolved, the invoice may be escalated. Escalation of the invoice may involve rejecting the invoice, partially paying the invoice, forwarding the invoice to a finance manager for further review, holding the invoice, or other action.

At ASN audit operation 814, details of the air carrier invoice may be audited against the PO associated with the PO number and the PO type. For instance, auditing the details of the air carrier invoice may involve comparing a bid rate, an estimated date of arrival ("EDA"), and/or an estimated landed cost ("ELC") of the PO to the billed rate, the actual date of arrival and/or the actual landed cost ("LC") of the air carrier invoice, and the like.

At determination operation 816, it may be determined whether there is a mismatch between the air carrier invoice and any details of the PO. If there is a PO mismatch, the method may progress to resolution operation 818. If there is not a PO mismatch, the method may progress to LSD audit operation 820.

At resolution operation 818, it may be determined whether the PO mismatch can be resolved. For instance, the PO mismatch may be corrected manually by a finance user or manager. Alternatively, the PO mismatch may be corrected based on current data retrieved from one or more external sources using different application programming interfaces ("APIs"). For instance, data from a PO table may be queried, including items such as a PO ID or a Department ID. If the PO mismatch can be resolved, the method may progress to LSD audit operation 820. If the PO mismatch cannot be resolved, the method may progress to escalate operation 810.

At LSD audit operation 820, details of the transport of goods associated with the air carrier invoice may be audited. For example, current data may be retrieved from various APIs, including a departure date, a departure port, an arrival port, one or more current carrier rates, among others. In some cases, the retrieved current data may be stored in a single local database as a "single source of truth" for reconciling invoices. During the LSD audit operation 820, the PO may be compared to the air carrier invoice and the current data to identify any discrepancies.

At approved invoice amount determination operation 822, based on the air carrier invoice and the current data evaluated during the LSD audit, it may be determined whether the billed invoice amount is an approved invoice amount. If the billed invoice amount matches the approved invoice amount, the method may progress to payment operation 830. If the billed invoice amount does not match the approved invoice amount, the method may progress to rate audit operation 824.

At rate audit operation 824, various aspects of the air carrier invoice associated with the billed invoice amount may be evaluated, including performing an expense code audit and bid validation. During rate audit operation 824, discrepancies associated with expense codes or bid validation may be identified.

At rate approval determination operation 826, it may be determined whether one or more carrier rates charged on the air carrier invoice are approved. If the carrier rate amounts match the approved rate amounts, the method may progress to payment operation 830. If the carrier rate amounts do not match the approved rate amounts, the method may progress to resolution operation 828.

At resolution operation 828, it may be determined whether the rate approval can be resolved. For instance, the carrier rate amounts may be approved manually by a finance user or manager based on current data retrieved from one or more external sources using different application programming interfaces ("APIs"). If the rate approval can be resolved, the method may progress to payment operation 830. If the rate approval cannot be resolved, the method may progress to escalate operation 810.

At payment operation 830, the carrier invoice may be approved for payment. For instance, a finance user may approve and select the invoice for payment or funding.

As should be appreciated, operations 802-830 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 9:
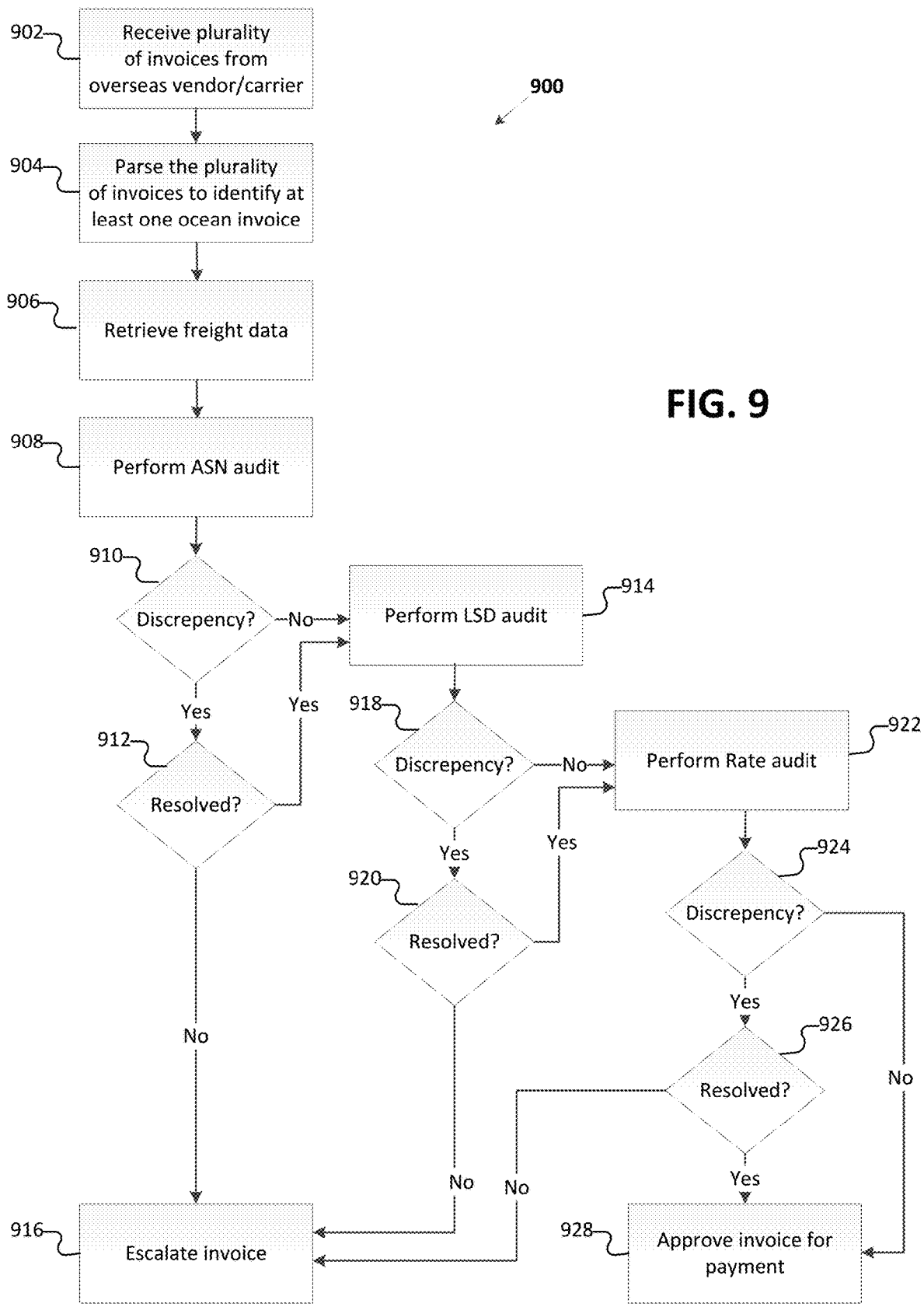
FIG. 9 provides a flow diagram of a method of reconciling an ocean invoice.

FIG. 9 provides a flow diagram of a method of reconciling an ocean invoice.

At receive operation 902, a plurality of invoices are received (e.g., from overseas carriers). For instance, the plurality of invoices may be in the form of electronic invoices (e.g., EDI 210) and may each include one or more of: a PO number, a BOL number, a carrier name, a billed landed cost ("LC"), a carrier rate and/or an invoice amount. The carrier invoice may be received and loaded into a software tool, such as the invoice reconciliation tool 204/304/404, described above.

At parse operation 904, the plurality of invoices may be parsed to identify at least one invoice from an ocean carrier (e.g., ocean carrier invoice). For example, the carrier name of the at least one invoice may be compared to an ocean carrier list to identify the at least one ocean carrier invoice. In some cases, a check can be performed to ensure that the ocean carrier invoice is not a duplicate.

At retrieve data operation 906, freight data associated with the ocean carrier invoice may be retrieved. For instance, freight data may include a departure date, a departure port, an arrival port, a fee list of the ocean carrier invoice, one or more container numbers, a BOL number, a PO number, and/or an invoice amount, among others. In some cases, the retrieved freight data may be retrieved from one or more APIs and stored in a single local database as a "single source of truth" for reconciling invoices.

At ASN audit operation 908, the ocean carrier invoice may be audited based on a number of criteria, including a carrier payment hold audit, a BOL audit, a container number audit, an invoice amount audit, a multiple PO discrepancy, and the like.

At discrepancy operation 910, it may be determined whether any discrepancies resulted from the ASN audit operation 908. For instance, if the carrier name is associated with a hold, this may be identified as a discrepancy and the method may progress to resolution operation 912. If a BOL number associated with the ocean carrier invoice is empty (or null), this may be identified as a discrepancy and the method may progress to resolution operation 912. If a list of equipment IDs associated with one or more containers of the ocean carrier invoice are not present on a common list of equipment IDs, this may be identified as a discrepancy and the method may progress to resolution operation 912. If the sum of the carrier fees is not equal to the invoice amount, this may be identified as a discrepancy and the method may progress to resolution operation 912. If multiple PO numbers (e.g., PO sequence identifiers) exist for the ocean carrier invoice, this may be identified as a discrepancy and the method may progress to resolution operation 912. If no discrepancies are identified in the ASN audit operation 908, the method may progress to LSD audit operation 914.

At resolution operation 912, it may be determined whether one or more discrepancies identified during ASN audit operation 908 can be resolved. For instance, the discrepancy may be updated manually by a finance user or manager based on freight data retrieved from one or more external sources using different application programming interfaces ("APIs"). For instance, a carrier name that is on hold may be manually reviewed. A BOL number that is null may be manually entered or retrieved and automatically populated from the current freight data. An equipment ID that is not on the list of common equipment IDs may be manually entered or automatically populated from retrieved data. If the discrepancy can be resolved, the method may progress to LSD audit operation 914. If the discrepancy cannot be resolved, the method may progress to escalate operation 916.

At LSD audit operation 914, details of the transport of goods associated with the ocean carrier invoice may be audited. For example, current data may be retrieved from various APIs, including a departure date, a port of export, a port of entry, a fee list of the carrier invoice, a vendor number, one or more commodity codes, and an invoice amount, among others. In some cases, the retrieved current data may be stored in a single local database as a "single source of truth" for reconciling invoices.

At escalate operation 916, when the discrepancy cannot be resolved, the invoice may be escalated. Escalation of the invoice may involve rejecting the invoice, partially paying the invoice, forwarding the invoice to a finance manager for further review, holding the invoice, or other action.

At discrepancy operation 918, it may be determined whether any discrepancies resulted from the LSD audit operation 914. For instance, if the port of export and/or the port of entry is null, a discrepancy may be identified and the method may progress to resolution operation 920. If the vendor number is not found or does not match, a discrepancy may be identified and the method may progress to discrepancy operation 920. If the one or more commodity codes do not exist, a discrepancy may be identified and the method may progress to discrepancy operation 920.

At resolution operation 920, it may be determined whether one or more discrepancies identified during LSD audit operation 914 can be resolved. For instance, the discrepancy may be updated manually by a finance user or manager based on freight data retrieved from one or more external sources using different application programming interfaces ("APIs"). For instance, the port of export and/or the port of entry may be manually entered or retrieved and automatically populated from the current freight data. A vendor number and/or one or more commodity codes may be manually entered or automatically populated from retrieved data. If the discrepancy can be resolved, the method may progress to rate audit operation 922. If the discrepancy cannot be resolved, the method may progress to escalate operation 916.

At audit rate operation 922, various aspects of the ocean carrier invoice associated with the invoice amount may be evaluated. During rate audit operation 922, a unique combination of a carrier name, carrier vessel, voyage, port of entry, port of export, and estimated data of arrival may be compiled. Based on the unique combination, a rate validation based on a rate table of current data may be performed. For instance, the current data may be retrieved from one or more external sources using different application programming interfaces ("APIs").

At discrepancy operation 924, it may be determined whether any discrepancies resulted from the rate audit operation 922. For instance, a rate table may include rates corresponding to a date of arrival (or a date of departure). If the rate of the ocean carrier invoice is different from a corresponding date on the rate table, a discrepancy may be identified and the method may progress to resolution operation 926. In some cases the difference between the rate and the corresponding rate may be compared to a difference tolerance limit. If the difference exceeds the difference tolerance limit, a discrepancy may be identified and the method may progress to resolution operation 926.

At resolution operation 926, it may be determined whether one or more discrepancies identified during rate audit operation 922 can be resolved. In aspects, the discrepancy may be updated manually by a finance user or manager based on freight data retrieved from one or more external sources using different application programming interfaces ("APIs"). For instance, the corresponding rate associated with a rate table for a particular date of arrival (or departure) may be manually entered or retrieved and automatically populated from the rate table. If the rate approval can be resolved, the method may progress to payment operation 928. If the rate approval cannot be resolved, the method may progress to escalate operation 916.

At payment operation 928, the carrier invoice may be approved for payment. For instance, a finance user may approve and select the invoice for payment or funding.

As should be appreciated, operations 902-928 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A method for processing an invoice from an overseas vendor, the method comprising:
    receiving, at a software tool implemented on a computing system, an invoice from an overseas vendor, wherein the invoice comprises a billed item, a billed price, a billed quantity, and a billed landed cost ("LC");
    processing the invoice by performing a basic audit of the invoice to reconcile the billed item and the billed quantity and by performing a charge audit to reconcile the billed price and the billed landed cost, each of the basic audit and the charge audit reconciliations including:
        retrieving real-time data from a plurality of resources external to the computing system by accessing at least a first resource via a first application programming interface (API) executed by the computing system and accessing a second resource via a second API executed by the computing system, the first resource being different from the second resource and the first API being different from the second API, wherein the first and second APIs are selected from APIs available within the computing system, the available APIs including:
            a vendor management (VM) API that enables access to real time item and quantity data associated with the billed item;
            a purchase order (PO) API that enables access to real time purchase order data associated with the billed item;
            an overseas transport manager (OTM) API that enables access to real time overseas payment data of a carrier of the billed item;
            an international carrier list (ICL) API that enables access to real time carrier rate data of the carrier of the billed item; and
            a landed cost (LC) API that enables access to real time an actual landed cost of the billed item, wherein the real-time data is stored in a single database that is local to the computing system, and wherein the real-time data includes at least:
            a purchase order comprising at least one ordered item, an agreed price, an ordered quantity, and an estimated landed cost ("ELC");
            a receipt from a distribution center, the receipt specifying a landed item and a landed quantity; and
            an actual landed cost ("ALC") for the landed item and landed quantity;
        based on the billed item matching the landed item, the billed price matching the agreed price, the billed quantity matching the landed quantity and the billed LC matching the ALC, determining that the invoice reconciles with the real-time data; and
        based on determining that the invoice reconciles with the real-time data, receiving a selection of the invoice for payment.

2. The method of claim 1, the method further comprising: based on the at least one billed item not matching the at least one landed item, the billed price not matching the agreed price, the billed quantity not matching the landed quantity or the billed LC not matching the ALC, determining that the invoice does not reconcile with the real-time data and that a discrepancy exists.

3. The method of claim 2, determining that the discrepancy is within a predetermined allowable variance and, based on the discrepancy being within the predetermined allowable variance, determining that the invoice reconciles with the real-time data.

4. The method of claim 1, wherein the receipt further comprises a condition indicator for the at least one landed item.

5. The method of claim 1, wherein the invoice is one of an Electronic Data Interchange ("EDI") 210 or an EDI 810.

6. The method of claim 1, wherein the purchase order is an EDI 850.

7. A retail enterprise server configured for processing an invoice from an overseas vendor, the retail enterprise server comprising:

a computing system comprising at least one processor communicatively coupled to at least one memory, the at least one memory storing computer-executable instructions comprising a software tool which, when executed, causes the computing system to:

process the invoice by performing a basic audit of the invoice to reconcile the billed item and the billed quantity and by performing a charge audit to reconcile the billed price and the billed landed cost, each of the basic audit and the charge audit reconciliations including:

retrieve real-time data from a plurality of resources external to the computing system by accessing at least a first resource via a first application programming interface (API) executed by the computing system and accessing a second resource via a second API executed by the computing system, the first resource being different from the second resource and the first API being different from the second API, wherein the first and second APIs are selected from APIs available within the computing system, the available APIs including:

a vendor management (VM) API that enables access to real time item and quantity data associated with the billed item;

a purchase order (PO) API that enables access to real time purchase order data associated with the billed item;

an overseas transport manager (OTM) API that enables access to real time overseas payment data of a carrier of the billed item;

an international carrier list (ICL) API that enables access to real time carrier rate data of the carrier of the billed item; and a landed cost (LC) API that enables access to real time an actual landed cost of the billed item, wherein the real-time data is stored in a single database that is local to the computing system, and wherein the real-time data includes at least:

a purchase order comprising at least one ordered item, an agreed price, an ordered quantity, and an estimated landed cost ("ELC");

a receipt from a distribution center, the receipt specifying a landed item and a landed quantity; and an actual landed cost ("ALC") for the landed item and landed quantity;

based on the billed item matching the landed item, the billed price matching the agreed price, the billed quantity matching the landed quantity and the billed LC matching the ALC, determine that the invoice reconciles with the real-time data; and based on determining that the invoice reconciles with the real-time data, receive a selection of the invoice for payment.

* * * * *